(12) United States Patent
Verburgh et al.

(10) Patent No.: US 9,418,433 B2
(45) Date of Patent: Aug. 16, 2016

(54) COMPUTING A DEPTH MAP

(75) Inventors: Reinout Verburgh, Roeselare (BE); Hans Achiel Gilberte Van Parys, Sint-Andries Brugge (BE)

(73) Assignee: Koninklijke Philips N.V., Eindhoven (NL)

( * ) Notice: Subject to any disclaimer, the term of this patent is extended or adjusted under 35 U.S.C. 154(b) by 1728 days.

(21) Appl. No.: 12/667,241

(22) PCT Filed: Jun. 24, 2008

(86) PCT No.: PCT/IB2008/052506
§ 371 (c)(1),
(2), (4) Date: Dec. 30, 2009

(87) PCT Pub. No.: WO2009/004527
PCT Pub. Date: Jan. 8, 2009

(65) Prior Publication Data
US 2010/0182410 A1  Jul. 22, 2010

(30) Foreign Application Priority Data

Jul. 3, 2007 (EP) .................................. 07111578

(51) Int. Cl.
*H04N 13/04* (2006.01)
*G06T 7/00* (2006.01)
*G06K 9/36* (2006.01)
*G06K 9/46* (2006.01)
(Continued)

(52) U.S. Cl.
CPC ............ *G06T 7/0071* (2013.01); *G06K 9/00* (2013.01); *G06K 9/36* (2013.01); *G06K 9/46* (2013.01); *H04N 13/026* (2013.01); *H04N 13/0285* (2013.01); *H04N 13/04* (2013.01)

(58) Field of Classification Search
USPC .................................. 348/51; 345/6; 382/285
See application file for complete search history.

(56) References Cited

U.S. PATENT DOCUMENTS

| 6,563,873 | B1 | 5/2003 | Wilinski et al. |
| 2004/0109585 | A1 | 6/2004 | Tao et al. |
| 2010/0182410 | A1 | 7/2010 | Verburgh et al. |

FOREIGN PATENT DOCUMENTS

| WO | 9940726 | A2 | 1/1999 |
| WO | 0191468 | A1 | 11/2001 |

(Continued)

OTHER PUBLICATIONS

WO 2005/083631 [Sep. 9, 2005]—Ernest.*
(Continued)

*Primary Examiner* — Kyung H Shin

(57) ABSTRACT

A system for computing a depth map comprising depth values representing distances to a viewer for respective pixels of an image. The system comprises an optimization unit (902) for determining a minimal depth related cost value of a current pixel, among a plurality of candidate cost values, wherein at least one of the candidate cost values is based on a depth related cost value of at least one pixel in a local neighborhood of the current pixel and on a difference between a color attribute of the at least one pixel in the local neighborhood and a corresponding color attribute of the current pixel, and at least one of the candidate cost values is based on a depth related cost value relating to at least one pixel outside the local neighborhood and on a difference between a color attribute of the at least one pixel outside the local neighborhood and a corresponding color attribute of the current pixel.

16 Claims, 6 Drawing Sheets

(51) Int. Cl.
*G06K 9/00* (2006.01)
*H04N 13/02* (2006.01)

(56) References Cited

FOREIGN PATENT DOCUMENTS

| WO | 2005083631 | A2 | 9/2005 |
| WO | 2006003577 | A1 | 1/2006 |
| WO | 2006136978 | A1 | 12/2006 |

OTHER PUBLICATIONS

Evren Imre et al, "Towards 3-D Scene Reconstruction From Broadcast Video", Signal Processing vol. 22, No. 2, Mar. 16, 2007, pp. 109-126.

* cited by examiner

COMPUTING A DEPTH MAP

FIELD OF THE INVENTION

The invention relates to computing a depth map.

BACKGROUND OF THE INVENTION

In order to generate a 3D impression on a multi-view display device, images from different virtual view points have to be rendered. This requires either multiple input views or some 3D or depth information to be present. This depth information can be recorded, generated from multiview camera systems or generated from conventional 2D video material. For generating depth information from 2D video several types of depth cues can be applied: such as structure from motion, focus information, geometric shapes and dynamic occlusion. The resulting depth map is subsequently used in rendering a multi-view image to give the viewer a depth impression.

WO 2005/083631 discloses a method of generating a depth map comprising depth values representing distances to a viewer, for respective pixels of an image. This method comprises: computing a cost value for a first one of the pixels of the image by combining differences between values of pixels which are disposed on a path from the first one of the pixels to a second one of the pixels which belongs to a predetermined subset of the pixels of the image; and assigning a first one of the depth values corresponding to the first one of the pixels on basis of the cost value.

The cited method is based on the following observation. Objects in a scene to be imaged have different sizes, luminances, and colors, and have a certain spatial disposition. Some of the objects occlude other objects in the image. Differences between luminance and/or color values of pixels in an image are primarily related to the differences between optical characteristics of the surfaces of the objects and related to the spatial positions of objects relative to light sources within the scene. Optical characteristics of surfaces comprise for example color and reflectiveness. Hence, a relatively large transition in luminance and/or color or a relatively large difference between pixel values of neighboring pixels corresponds to a transition between a first image segment and a second image segment, whereby the first image segment corresponds to a first object and the second image segment corresponds to a second object in the scene being imaged. By determining for the pixels of the image the number of and extend of transitions in luminance and/or color, or differences between pixel values on a path from the respective pixels to a predetermined location of the image, respective measures related to the spatial disposition of the objects in the scene can be achieved. These measures, or cost values, are subsequently translated into depth values. This translation is preferably a multiplication of the cost value with a predetermined constant. Alternatively, this translation corresponds to a mapping of the respective cost values to a predetermined range of depth values by means of normalization. It should be noted that the background also forms one or more objects, e.g. the sky or a forest or a meadow.

The depth value which is based on the luminance and/or color transients can be directly used as depth value for rendering a multi-view image.

SUMMARY OF THE INVENTION

It would be advantageous to have an improved system for computing a depth map. To better address this concern, in a first aspect of the invention a system is presented that is capable of computing a depth map comprising depth values representing distances to a viewer for respective pixels of an image, the system comprising:

an optimization unit for determining a depth related cost value of a current pixel, the depth related cost value being a minimal cost value among a plurality of candidate cost values, wherein at least one of the candidate cost values is based on a depth related cost value of at least one pixel in a local neighborhood of the current pixel and on a difference between a color attribute of the at least one pixel in the local neighborhood and a corresponding color attribute of the current pixel, and at least one of the candidate cost values is based on a depth related cost value relating to at least one pixel outside the local neighborhood and on a difference between a color attribute of the at least one pixel outside the local neighborhood and a corresponding color attribute of the current pixel;

the system further comprising an assigner for assigning a depth value to the current pixel in dependence on the determined depth related cost value.

The system is based on the idea, that changes in depth usually coincide with object boundaries, and object boundaries usually coincide with changes in a color attribute. Accordingly, the depth of a current pixel can be estimated by considering the depth of a pixel in a local neighborhood of the current pixel and the difference with respect to at least one color attribute relating to these pixels. The local neighborhood preferably comprises pixels that are close enough to the current pixel to be able to observe local changes in the color attribute occurring at the current pixel. However, looking only at the pixels in the neighborhood results in unrealistic depth maps, as it cannot be determined whether a current pixel belongs to an object which is also visible elsewhere in the image, and hence different parts of the object are not always assigned similar depth values. By taking into account the at least one pixel outside the neighborhood, this situation is improved.

Preferably, the differences mentioned are absolute differences. Also preferably, the cost value relating to the at least one pixel (in or outside the neighborhood) is added to the respective absolute difference to obtain the candidate cost value.

As an intermediate step, a cost function is determined which is related to the depth value, for example the cost function may coincide with the depth or be inverse proportional to the depth. Preferably, a low cost function corresponds to a depth value indicative of a location far away from the viewer, whereas a high cost function corresponds to a depth value indicative of a location close to the viewer.

An embodiment comprises a selector for randomly selecting the at least one pixel outside the local neighborhood from a set of candidates spanning an image area having a length of more than half of an image width. This way, after having processed a relatively small number of current pixels, pixels spanning a relatively large image area has been taken into account.

An embodiment comprises a statistics unit 908 for computing the cost value relating to the at least one pixel outside the local neighborhood based on respective cost values relating to respective ones of the at least one pixel outside the local neighborhood; and a statistics unit 910 for computing the color attribute relating to the at least one pixel outside the local neighborhood based on respective color attributes relating to the respective ones of the at least one pixel outside the local neighborhood.

By using statistical values, the negative influence of noise and outliers is reduced.

An embodiment comprises an iterator 912 for causing the optimization unit to process successive pixels of the image, wherein a pixel being processed is the current pixel, the iterator being arranged for either starting at a top of the image and working downwards, or starting at a bottom of the image and working upwards. It is assumed that often, the layout of an image is such that the lower in the image, the closer the objects are to the viewer. When processing the image from top to bottom or from bottom to top, it is easy to create a depth map that satisfies this assumption.

In an embodiment, the iterator is arranged for causing the optimization unit to process successive rows of the image, alternating from left to right and from right to left. This helps to avoid any undesired difference between the depth values at the left side and the depth values at the right side of the image.

An embodiment comprises a selector for randomly selecting the at least one pixel outside the local neighborhood from a set of candidates spanning an image area having a width of more than half of an image width, wherein the image area is a substantially horizontal strip. Because the spanned image area is a substantially horizontal strip, all candidates have approximately the same height in the image, and considering the above mentioned assumption regarding the layout of an image, this helps to make the candidates more similar to each other with respect to any differences in cost value that might be caused by the vertical location of the candidate.

In an embodiment, the at least one pixel outside the local neighborhood is a plurality of pixels spanning a substantially horizontal line segment of the image. This way, the plurality of pixels have the same height in the image. Considering the above mentioned assumption regarding the layout of an image, this helps to compute more reliable statistics.

In an embodiment, the color attribute depends on at least one of luminance and chromaticity. These are common color attributes appearing in images.

In an embodiment, the optimization unit is arranged for computing the cost value also in dependence on a depth cue based on a predefined depth model. This way, more accurate depth information is obtained by combining the depth based on color attribute differences with any previously acquired depth information. Although such previously acquired depth information may be unreliable by itself, the combination with the cost value computation as set forth results in an unexpected improvement in the quality of the depth estimate.

An embodiment comprises a selective blurring unit for blurring at least one region of the image that is in a background according to a predefined depth model before determining the cost value by the optimization unit. The quality of the depth estimate is increased if background objects are somewhat blurred, because the differences in the color attribute are smaller in blurred regions of the image.

In an embodiment, the predefined depth model is a depth from motion model. In particular the combination of a predetermined depth model based on depth from motion and a selective blurring unit set forth was found to provide high quality depth maps.

An embodiment comprises an integrated circuit for computing a depth map comprising depth values representing distances to a viewer for respective pixels of an image, the integrated circuit comprising:

circuitry for determining a depth related cost value of a current pixel, the depth related cost value being a minimal cost value among a plurality of candidate cost values, wherein at least one of the candidate cost values is based on a depth related cost value of at least one pixel in a local neighborhood of the current pixel and on a difference between a color attribute of the at least one pixel in the local neighborhood and a corresponding color attribute of the current pixel, and at least one of the candidate cost values is based on a depth related cost value relating to at least one pixel outside the local neighborhood and on a difference between a color attribute of the at least one pixel outside the local neighborhood and a corresponding color attribute of the current pixel;

the system further comprising an assigner for assigning a depth value to the current pixel in dependence on the determined depth related cost value.

An embodiment comprises a television comprising:

a 3D display for providing a video rendering having a three-dimensional appearance based on a depth map; and a system for computing a depth map comprising depth values representing distances to a viewer for respective pixels of an image, the system comprising:

an optimization unit for determining a depth related cost value of a current pixel, the depth related cost value being a minimal cost value among a plurality of candidate cost values, wherein at least one of the candidate cost values is based on a depth related cost value of at least one pixel in a local neighborhood of the current pixel and on a difference between a color attribute of the at least one pixel in the local neighborhood and a corresponding color attribute of the current pixel, and at least one of the candidate cost values is based on a depth related cost value relating to at least one pixel outside the local neighborhood and on a difference between a color attribute of the at least one pixel outside the local neighborhood and a corresponding color attribute of the current pixel;

the system further comprising an assigner for assigning a depth value to the current pixel in dependence on the determined depth related cost value.

An embodiment comprises a camera comprising:

a capture means for capturing a video signal comprising a sequence of images;

a system for computing a depth map comprising depth values representing distances to a viewer for respective pixels of one of the images, the system comprising:

an optimization unit for determining a depth related cost value of a current pixel, the depth related cost value being a minimal cost value among a plurality of candidate cost values, wherein at least one of the candidate cost values is based on a depth related cost value of at least one pixel in a local neighborhood of the current pixel and on a difference between a color attribute of the at least one pixel in the local neighborhood and a corresponding color attribute of the current pixel, and at least one of the candidate cost values is based on a depth related cost value relating to at least one pixel outside the local neighborhood and on a difference between a color attribute of the at least one pixel outside the local neighborhood and a corresponding color attribute of the current pixel;

an assigner for assigning respective depth values to the respective current pixels in dependence on the respective determined depth related cost values to obtain the depth map;

a first output for providing the captured video signal; and a second output for providing the depth map.

An embodiment comprises a method of computing a depth map comprising depth values representing distances to a viewer for respective pixels of an image, the method comprising:

determining a depth related cost value of a current pixel, the depth related cost value being a minimal cost value among a plurality of candidate cost values, wherein at least one of the candidate cost values is based on a depth related cost value of at least one pixel in a local neighborhood of the current pixel and on a difference between a color attribute of the at least one pixel in the local neighborhood and a corresponding color attribute of the current pixel, and at least one of the candidate cost values is based on a depth related cost value relating to at least one pixel outside the local neighborhood and on a difference between a color attribute of the at least one pixel outside the local neighborhood and a corresponding color attribute of the current pixel;

the method further comprising assigning a depth value to the current pixel in dependence on the determined depth related cost value.

An embodiment comprises a computer program product for computing a depth map comprising depth values representing distances to a viewer for respective pixels of an image, the computer program product comprising computer executable instructions for causing a processor to perform the steps of:

determining a depth related cost value of a current pixel, the depth related cost value being a minimal cost value among a plurality of candidate cost values, wherein at least one of the candidate cost values is based on a depth related cost value of at least one pixel in a local neighborhood of the current pixel and on a difference between a color attribute of the at least one pixel in the local neighborhood and a corresponding color attribute of the current pixel, and at least one of the candidate cost values is based on a depth related cost value relating to at least one pixel outside the local neighborhood and on a difference between a color attribute of the at least one pixel outside the local neighborhood and a corresponding color attribute of the current pixel; and assigning a depth value to the current pixel in dependence on the determined depth related cost value.

BRIEF DESCRIPTION OF THE DRAWINGS

These and other aspects of the invention will be further elucidated and described with reference to the drawing, in which.

DETAILED DESCRIPTION OF EMBODIMENTS

Figure 1:
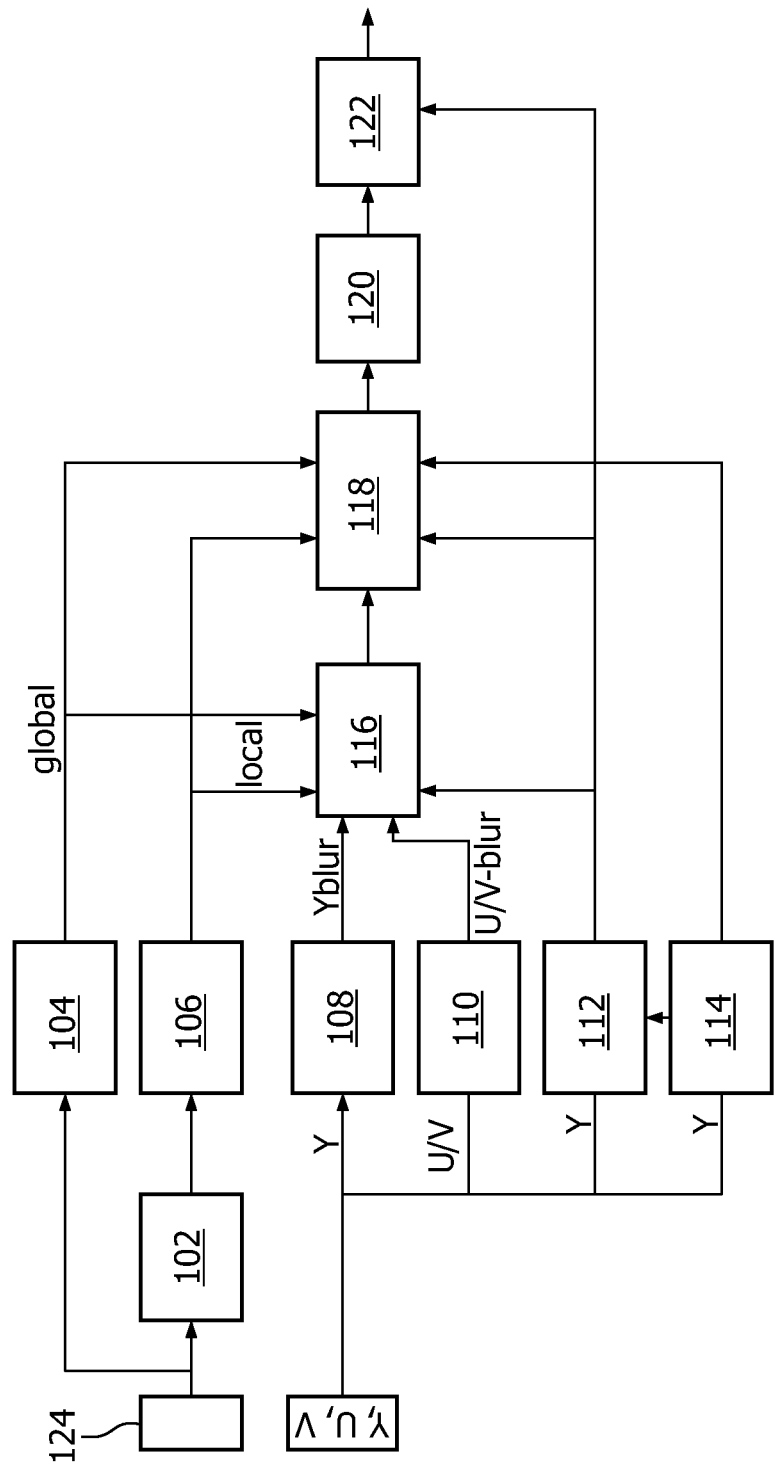
FIG. 1 illustrates an architecture of a video system.

FIG. 1 shows a block diagram giving a high level overview of an embodiment of a depth estimation algorithm. As input Y,U,V, a file providing luminance (Y) and chromaticity (U,V) values can be used. Both horizontal and vertical black bars (also known as curtains) are detected in block 114 in a way known in the art. This block 114 returns a source window, containing the coordinates of the real active video. The black bar detector can overrule the scene change detector 112 in case the source window changes.

A scene change detector 112 outputs the number of frames after a scene change, preferably clipped between predetermined bounds. The scene change detector 112 for example calculates the difference between the current and the pre-previous frame (i.e., the frame before the previous frame) in the source window. If the difference is greater than a predetermined threshold per pixel, a scene change is reported. Scene change detectors are known in the art.

A depth from motion (DFM) block 102 provides a depth map based on an input motion vector field 124, for example using a known method (for examples, see WO 99/40726, U.S. Pat. No. 6,563,873, and WO 01/91468). Based on the incoming motion vector field 124 (i.e. coming from a motion estimator), the depth from motion block 102 calculates a depth cue. For example, one possible way to implement a DFM block 102 is by comparing the motion vector field with a background motion vector field. In that case, the background motion vector field is computed based on an overall movement in the image (e.g. pan-zoom parameters). Based on the motion vector field 124 and the background motion vector field, depth from motion is calculated. This is done by calculating the AVD (Absolute Vector Distance, i.e. the sum of the absolute values of the differences of X and Y components of the background motion vector and input motion vector) for vectors in the vector field. The result is a vector field representing a motion estimation of the video signal. However, the use of background vector field and pan-zoom parameters is optional. The motion estimation is converted into a depth map.

In block 106, the depth map is smoothed. In blocks 108 and 110, the input image is filtered by a Gauss-kernel. Block 108 handles the luminance (Y), and block 110 handles the chromaticity (U,V). Preferably an edge preserving filter is used. The result is a blurred image.

It was observed that the depth estimation is improved by using images shot by a camera with a shallow focus depth. In other words, when the background is blurred and the foreground object is sharp, the depth estimation algorithm performs relatively good. To mimic this behavior, in block 116, background portions of the image are blurred while leaving foreground portions unblurred. Using the motion based depth map, the original input and the blurred image, a new intermediate mixed image is created by mixing the original input and the blurred image in dependence on the motion based depth map. First, a threshold is subtracted from the depth from motion value, to reduce noise. Based on the resulting value, a mix factor ranging from 0 to 1 is calculated, where the mix factor is larger for background regions and the mix factor is smaller for foreground regions. The output of block 116 is then:

output_image=mixfactor*blurred_image+(1−mixfactor) *input_image.

The blurring of the background may reduce halo in the output of the depth estimation block 118.

In block 118, the partially blurred image output of block 116, the smoothed depth-from-motion output of block 106 are combined to obtain an improved depth map. To this end, a cost value is computed relating to a pixel. In block 118, the lines of the image are scanned (meandered), starting at the uppermost line down to the bottom line, and alternating from left to right and from right to left. The cost value of a current pixel is the minimum value taken from a set of candidate cost values. A candidate cost value is the sum of the cost value of another pixel and the absolute value of the difference between the other pixel's luminance value and the current pixel's luminance value. Instead of luminance values, any pixel parameters such as chromaticity-related values or any color related values may be used.

Figure 2A:
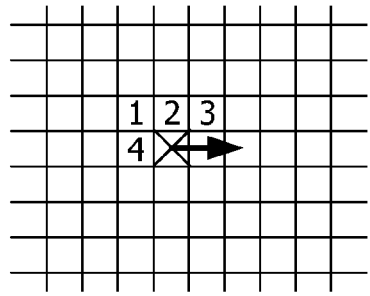
FIGS. 2, 3, 4, 5, and 6 illustrate processing of a detail of an image.
Figure 2B:
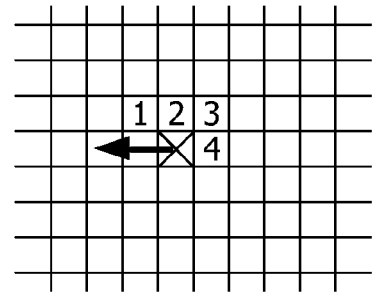

FIGS. 2A and 2B depict the candidate pixels that correspond to the candidate cost values. FIG. 2A shows the situation when a line is traversed from left to right, whereas FIG. 2B shows the situation when a line is traversed from right to left. In both Figs., the current pixel is indicated by a cross. The arrow indicates the order in which the pixels are processed. The numbered pixels 1-4 indicate the candidate pixels corresponding to the candidate cost values. Since the lines are processed from top to bottom, it can be seen that the pixels directly adjacent to the current pixel are used, insofar as they have already been processed. Consequently, the three pixels above the current pixel and the previously processed pixel are used to determine the candidate cost values.

The cost value may be computed as follows. First, the candidate values are computed, i.e., for each of the candidate pixels 1-4 as illustrated in FIGS. 2A or 2B, the candidate cost value is computed. This candidate cost value is the cost value of the candidate pixel plus the absolute difference between the luminance of the candidate pixel and the luminance of the current pixel, i.e.

candidate_cost=cost_of_candidate_pixel+ABS(luminance_of_candidate_pixel−luminance_of_current_pixel)

Of the four candidate cost values corresponding to the four candidate pixels 1-4, the minimum value is determined and this is the cost value assigned to the current pixel. The cost value for each pixel may then be used as a depth cue. For example the depth value of a pixel is derived from the cost function by dividing a fixed constant by the cost value.

The computation of the cost value can be enhanced in several ways. Some exemplary enhancements will be outlined now. For example, a straightforward extension is that chromaticity may be used as well in addition to luminance. Instead of individual pixels (1-4 in FIGS. 2A-2B), groups of pixels may be averaged to reduce noise effects. The cost values may be averaged, for example using a 3×3 kernel, to further reduce noise effects. Also, cost values computed for previous frames can be involved, to increase temporal stability. Furthermore, not only candidate values relating to the four neighboring (groups of) pixels are used, but in addition an average value taken from a previous line segment is used: a form of background correlation. This allows the algorithm to scan through the image without always assigning larger and larger cost values, thus preventing undesirably high values. This is especially important in an object with high depth from motion values.

Further improvement is achieved by, after having selected the minimum cost candidate, adding the depth from motion (DfM) of the corresponding pixel to the candidate cost value to obtain the final cost value of the current pixel. This is preferably done within the recursion core. This usage of the DfM value is a good compromise with respect to reliability and stability, taking the volatile character of the DfM into account.

Further improvement may be achieved by adding a value to the cost value that is based on local texture of the image. This could be extended with relatively complex filters such as an edge detector.

Figure 5:
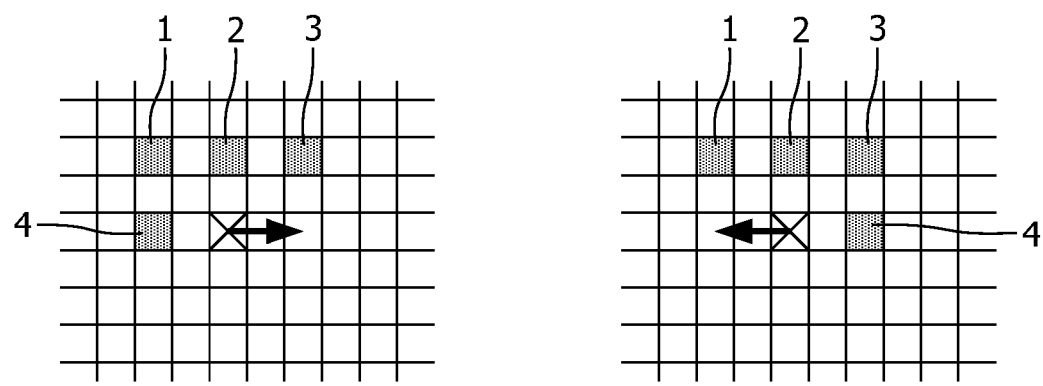

Further improvement may be achieved by selecting the candidate cost values not from immediately adjacent neighboring pixels (or groups of pixels) like in FIG. 2A/2B. For example, pixels two rows and/or two columns away from the current (group of) pixels may be used as is illustrated in FIG. 5. This results in a more coherent depth cue.

Figure 3:
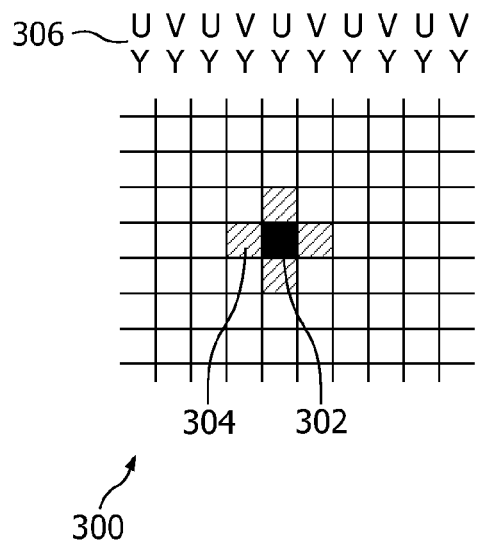
Figure 3:
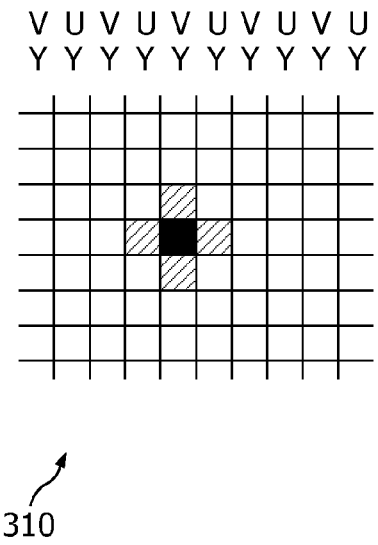

FIG. 3 illustrates how luminance (luma) and chromaticity (chroma) are handled in a 'pixel cross'. Consider the image fragment 300 consisting of a grid of pixels indicated by squares. Each pixel has a luma value Y associated with it. Each pixel only has either a U or a V coordinate of the chroma associated with it, depending on the column in the image as indicated. When evaluating luma of a pixel 302, the luma of four surrounding pixels 304 (indicated by dashed boxes) is averaged. The luma of the pixel 302 itself is preferably not used. When evaluating the U component of chroma, the two dashed pixels above and below pixel 302 are averaged. When evaluating the V component of chroma, the two dashed pixels to the left and to the right of the pixel 302 are averaged. Instead of averaging some other combination may be realized. Image fragment 310 shows a similar constellation, however the pixel to be evaluated, denoted as a black square in image fragment 310, is in a V column as indicated; therefore, when evaluating the U component of chroma, the two dashed pixels to the left and to the right of the black pixel in image fragment 310 are averaged, and when evaluating the V component of chroma, the two dashed pixels above and below the black pixel in image fragment 310 are averaged. The use of a 'pixel cross' is an advantageous way to handle image data in which not all pixels contain all attributes, in particular the case where alternating columns or rows contain two alternating types of attributes. All samples are taken from current image. However, alternatively the pixel data from previous or subsequent frames may be combined to improve temporal stability.

Although in this description, the example of alternating U and V coordinates of chroma is discussed, the concept of 'pixel cross' can be extended to any kind of attributes. It will be understood that the methods and systems described in this document are not limited to images with alternating U and V columns. For example, images wherein each pixel has Y, U, and V attributes can be used. U and V values may be averaged to obtain a single value representing a measure of the chroma.

In this description, Y, U, and V are used as color attributes as an example. However, other kinds of color attributes may also be used, such as RGB attributes. These color attributes and differences between color attributes of different pixels may be used directly, or one or more of the color attributes Y, U, and/or V may be computed from the given color attributes in a way known in the art.

Figure 4:
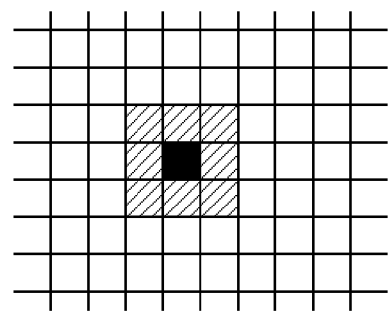

FIG. 4 illustrates an embodiment in which, when evaluating previously computed cost values, the cost values of a 3×3 block (a 'pixel block') around a center pixel are averaged to obtain a spatially filtered cost value. A weighted average may be used giving more weight to the center pixel. Preferably, the cost values relating to a previous or a subsequent frame may be involved to improve the temporal stability. For example, some of the cost values in the 3×3 pixel block may simply be replaced by corresponding cost values in a previous frame.

FIG. 5 illustrates and embodiment in which, instead of using directly neighboring pixels as in FIG. 2, pixels located at a distance of two rows and/or columns are used. Thus, the cost candidates are not located right next to the current pixel. This is advantageously combined with the use of pixel crosses and pixel blocks as described above.

Figure 6:
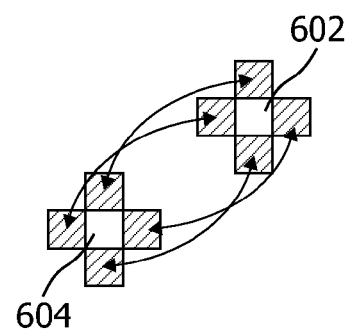

FIG. 6 illustrates the pair wise comparison of the luma and chroma values in two pixel crosses having two respective center pixels 602 and 604. It can be seen that the pixels above the center pixels are compared, the pixels to the right of the center pixel are compared, the pixels below the center pixels are compared, and the pixels to the left of the center pixels are compared. For luma, the four corresponding differences can be averaged. For chroma, there are two types of samples (U and V), which should be subtracted separately. The same is true when computing statistics for a pixel cross: average luma is based on four pixels, whereas average chroma U and average chroma V are based on two pixels.

Figure 7:
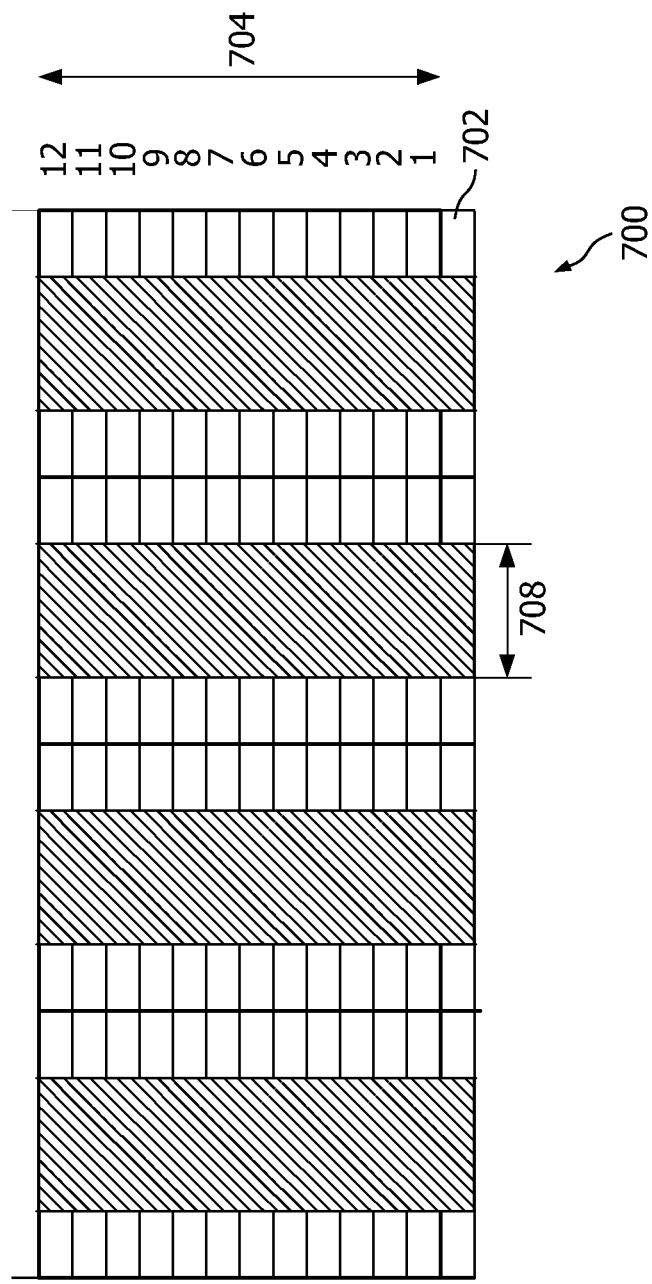
FIG. 7 illustrates several rows of an image.

FIG. 7 illustrates that, in addition to the four candidates 1-4 of FIG. 5, a fifth candidate is used based on statistics of previous line segments. To this end, the statistics of a pixel cross are computed. The luma values, chroma U and chroma V values appearing in a pixel cross are averaged to obtain the statistics of a pixel cross. These statistics are computed for the pixel cross of the current pixel.

Next, the statistics of the current pixel are compared with statistics relating to a fifth candidate. This fifth candidate is selected pseudo-randomly from a set of statistical candidates. Each statistical candidate relates to a plurality of pixels, for example grouped in a line segment. The statistical candidate results in a fifth candidate cost value. The final cost value of a pixel is the minimum of all candidate cost values.

FIG. 7 illustrates a portion 700 of an image, the portion 700 comprising a plurality of rows of the image. Row 702 represents the row that is currently being processed, i.e. the current pixel is part of row 702. Each row has a number of 'active line segments' with a given width 708. These active line segments are indicated as dashed. The remaining pixels are indicated as white in the Figure.

For example, the number of columns of the image is 740 and the number of active line segments for each row is set to 4. For example, the active line segments are evenly distributed along each row. For example, the length of an active line segment is set to 45, and the remaining pixels are not part of any active line segment. For each active line segment, statistics are computed including for example average luma, chroma U, chroma V, and cost value.

When processing a current pixel to compute the cost value, the statistics are gathered for the pixel cross around the current pixel. When the end of a line segment is reached, the statistics of the pixel crosses along the line segment are averaged to obtain statistics relating to the line segment.

Dark areas have, by definition, low luma values and low chroma values. As a result, in scenes where (part of) the background is dark, objects in the image with a dark color will cause the statistical candidate originating from this dark background as the minimal candidate cost value, and thus the cost value of pixels that are part of these dark objects will be influenced by the dark background pixels. This introduces depth wholes in the image. This effect is reduced by adding a penalty to statistics relating to those dark areas. This penalty is added to the cost value when determining the minimum candidate cost value to reduce the likelihood that the dark candidate statistic cost value will be selected as the minimum candidate.

It is advantageous to only use a few statistical candidates or only a single statistical candidate as candidates for each pixel. This reduces the amount of required computation. It also improves the resulting depth map. It is advantageous to select one (pseudo-)randomly selected statistical candidate. More statistical candidates may also be used. Preferably the statistical candidate is selected from line segments from a row that is not too far away from the row comprising the current pixel. For example, the statistics of line segments in the last few rows are stored and the candidate is selected randomly from these line segments. Advantageously, except for the first part of the image, the candidate statistic should relate to a line segment at least a predetermined number of rows up from the current pixel. This helps to avoid ringing artifacts.

After having selected the best candidate cost value, which is the minimum value, the depth from motion value is added to this best candidate cost value to form the final cost value. The depth from motion is first multiplied by a weight factor before the addition. Advantageously, the weight factor is larger for the higher rows of the image and smaller for lower rows of the image. For example, the weight factor linearly decreases after each row. This helps to avoid or reduce a 'slant' effect, which causes objects to appear to lean back in the final depth map. This effect may also be reduced by correcting the cost values directly.

Because of the use of pixel crosses, several pixels around the current pixel are averaged rather than using the luma and chroma values of a single pixel directly. This may cause reduced performance near object edges, and may in particular cause a low cost value at edges, and as a result low depth 'leaks' into objects, especially in combination with a statistical candidate cost value. To avoid or reduce this effect, edges may be detected, for example by evaluating jumps in luma and/or chroma. For example, the absolute difference between luma and/or chroma values relating to different pixels in a pixel cross may be added to the cost value, after applying a weight factor to this difference.

Similar to the contributions to the cost value based on depth from motion and based on edge detection, as described above, other information may be incorporated to further refine the cost value and thereby enhance the resulting depth map. For example depth information from algorithms estimating the physical structure of the scene, sky detectors, etc may be incorporated in a similar way.

If black curtains and adjacent black image parts were treated the 'normal' way, low depth values would propagate via the curtains into the adjacent dark image areas and create depth holes.

Figure 8:
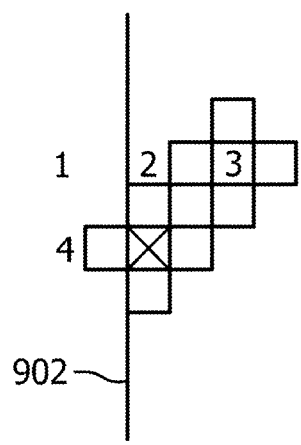
FIG. 8 illustrates processing of a detail of an image.

To avoid this, before scanning a line, a 'black curtain status' is set. Black curtains are at least 4 pixels wide, even if active video is detected within those first 4 pixels. This allows to treat the first pixels (most left or most right, depending on the scanning direction) in a special way; avoiding complicated data fetching (i.e. clipping) near the borders. Indeed, in black curtains, only the current pixel-cross is of importance. Per pixel, only one pixel cross is fetched in the row above the current row and one in the current row, respectively the crosses around 3 and X in FIG. 8. This FIG. also shows the left image border 902. This way, only from the fifth pixel onwards, the candidates are filled in the normal way with image data.

After those 4 pixels, the average luma value of the current pixel-cross is fetched and compared with a threshold. If the average is below the threshold, the black curtain status is maintained. If it exceeds the threshold for a predetermined number of times, the black curtains status is released and the operation is normalized.

The cost value in the black curtains is computed as follows. The cost of the last or first active column is used, increased by a small penalty value. Consequently, in the black curtains the cost value is independent from the current pixel cross. Also, the depth value in black curtains is related to image parts that do not necessarily touch the border.

After the cost values have been computed for all pixels, a scaling may be performed. Also, a downscaling may be performed to reduce the number of bits required for storing each cost value. A clipping may also be performed. Also, a spatial and/or temporal filtering may be performed.

Figure 9:
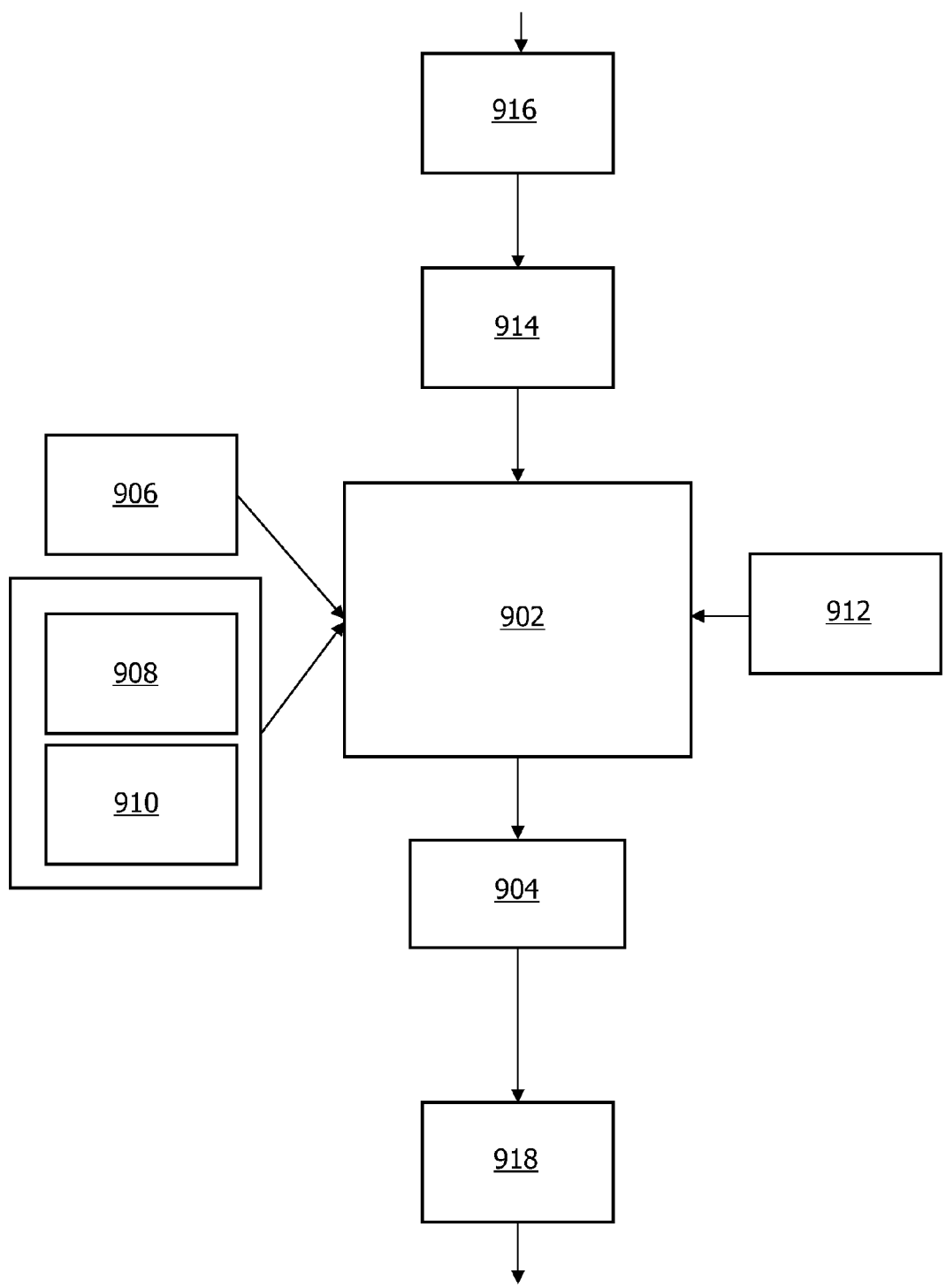
FIG. 9 illustrates several embodiments.

FIG. 9 illustrates several embodiments of the invention. The FIG. generally shows a system for computing a depth map comprising depth values representing distances to a viewer for respective pixels of an image. The system comprises an input 916 for obtaining an image for which the depth map should be computed and an output 918 for providing the finally computed depth map. The system also comprises an optimization unit 902, an assigner 904, a selector 906, two statistics units 908 and 910, an iterator 912, and a selective blurring unit 914.

The image obtained from the input 916 is provided to the optimization unit 902, which determines a depth related cost value of a current pixel wherein the depth related cost value is a minimal cost value among a plurality of candidate cost values. To that end, the optimization unit 902 defines a local neighborhood around the current pixel. Examples of a local neighborhood are: all pixels adjacent to the current pixel; all pixels within a predetermined distance from the current pixel; all pixels at most one pixel, three pixels, or five pixels away from the current pixel. At least one of the candidate cost values is based on a depth related cost value of at least one pixel in the local neighborhood of the current pixel and on a difference between a color attribute of the at least one pixel in the local neighborhood and a corresponding color attribute of the current pixel. The local neighborhood is preferably chosen such that said difference relates to changes in the color attribute occurring at the current pixel. Moreover, at least one of the candidate cost values is based on a depth related cost value relating to at least one pixel outside the local neighborhood and on a difference between a color attribute of the at least one pixel outside the local neighborhood and a corresponding color attribute of the current pixel. This last mentioned difference preferably does not relate to changes in the color attribute occurring at the current pixel. Rather, it preferably involves a comparison with a reference value relating to somewhere outside the local neighborhood.

The system further comprising an assigner 904 for assigning a depth value to the current pixel in dependence on the determined depth related cost value. The assigner may simply copy the depth related cost value. It may also assign an inverse value or negation of the depth related cost value. It may also assign a value corresponding to some function of the depth related cost value. Such a function is preferably a monotonic function.

An embodiment further comprises a selector 906 for selecting the at least one pixel outside the local neighborhood of the current pixel such that a probability that a straight line connecting the current pixel and the at least one pixel outside the local neighborhood crosses a boundary of an object in the image is larger than a probability that a line connecting the current pixel and the at least one pixel inside the local neighborhood crosses a boundary of the object in the image.

In another embodiment, the selector 906 randomly selects the at least one pixel outside the local neighborhood from a set of candidates spanning an image area having a length of more than half of an image width.

An embodiment comprises a statistics unit 908 for computing the cost value relating to the at least one pixel outside the local neighborhood based on respective cost values relating to respective ones of the at least one pixel outside the local neighborhood; and a statistics unit 910 for computing the color attribute relating to the at least one pixel outside the local neighborhood based on respective color attributes relating to the respective ones of the at least one pixel outside the local neighborhood. This way the reference value is based on statistics, which provides a more stable behavior.

An embodiment comprises an iterator 912 for causing the optimization unit to process successive pixels of the image, wherein a pixel being processed is the current pixel, the iterator being arranged for either starting at a top of the image and working downwards, or starting at a bottom of the image and working upwards.

In an embodiment, the iterator is arranged for causing the optimization unit to process successive rows of the image, alternating from left to right and from right to left. In an embodiment, the selector 906 randomly selects the at least one pixel outside the local neighborhood from a set of candidates spanning an image area having a width of more than half of an image width, wherein the image area is a substantially horizontal strip.

Preferably, the at least one pixel outside the local neighborhood is a plurality of pixels spanning a substantially horizontal line segment of the image. The color attribute preferably depends on at least one of luminance and chromaticity. Preferably, the optimization unit is arranged for computing the cost value also in dependence on a depth cue based on a predefined depth model. Preferably, a selective blurring unit 914 is provided for blurring at least one region of the image that is in a background according to a predefined depth model before determining the cost value by the optimization unit. Preferably, the predefined depth model is a depth from motion model.

The system set forth may be implemented as part of an integrated circuit, for example a video processing chip. The system set forth or the integrated circuit set forth may be part of a television capable of rendering three-dimensional images, for example an LCD television provided with a lenticular screen, which allows rendering of images with a depth impression without requiring viewers to wear stereoscopic glasses. Of course, systems with stereoscopic glasses (e.g. LCD shutter glasses or red/green glasses) may also be used.

The system set forth may also be incorporated in a camera or in a video mastering tool.

A method of computing a depth map comprising depth values representing distances to a viewer for respective pixels of an image is described herein. The method comprises determining a depth related cost value of a current pixel, the depth related cost value being a minimal cost value among a plurality of candidate cost values, wherein at least one of the candidate cost values is based on a depth related cost value of at least one pixel in a local neighborhood of the current pixel and on a difference between a color attribute of the at least one pixel in the local neighborhood and a corresponding color attribute of the current pixel, and at least one of the candidate cost values is based on a depth related cost value relating to at least one pixel outside the local neighborhood and on a difference between a color attribute of the at least one pixel outside the local neighborhood and a corresponding color attribute of the current pixel. The method further comprises assigning a depth value to the current pixel in dependence on the determined depth related cost value.

The method and system may also be implemented in a computer program product for computing a depth map comprising depth values representing distances to a viewer for respective pixels of an image. The computer program product comprises computer executable instructions for causing a processor to perform the step of determining a depth related cost value of a current pixel, the depth related cost value being a minimal cost value among a plurality of candidate cost values, wherein at least one of the candidate cost values is based on a depth related cost value of at least one pixel in a local neighborhood of the current pixel and on a difference between a color attribute of the at least one pixel in the local neighborhood and a corresponding color attribute of the current pixel, and at least one of the candidate cost values is based on a depth related cost value relating to at least one pixel outside the local neighborhood and on a difference between a color attribute of the at least one pixel outside the local neighborhood and a corresponding color attribute of the current pixel. The computer program product further comprises computer executable instructions for causing a processor to perform the step of assigning a depth value to the current pixel in dependence on the determined depth related cost value.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for computing a depth map comprising depth values representing distances to a viewer for one or more of a plurality of pixels of an image, the system comprising:
    an optimization unit for defining a neighborhood of a current pixel of the plurality of pixels and for determining a depth related cost value of the current pixel, the depth related cost value being a minimal cost value among cost values of
        first pixels selected from the plurality of pixels in the neighborhood of the current pixel based on a difference between a color attribute of the first pixels and a corresponding color attribute of the current pixel, and
        second pixels selected from the plurality of pixels outside the neighborhood based on a difference between the color attribute of the second pixels and a corresponding color attribute of the current pixel, wherein the pixels in the neighborhood of the current pixel are within a predetermined distance from the current pixel and the pixels outside the neighborhood are further than the predetermined distance from the current pixel; and
    an assigner for assigning a depth value to the current pixel in dependence on the determined depth related cost value.

2. The system according to claim 1, further comprising a selector for randomly selecting the one or more of the plurality of pixels spanning an image area having a length of more than half of an image width.

3. The system according to claim 1, further comprising:
    a statistics unit for computing the depth related cost value of the at least one pixel outside the neighborhood; and
    a statistics unit for computing the color attribute of the at least one pixel outside the neighborhood.

4. The system according to claim 3, wherein the second pixels comprise a plurality of pixels spanning a substantially horizontal line segment of the image.

5. The system according to claim 1, further comprising an iterator for causing the optimization unit to process successive pixels of the image,
    wherein a pixel being processed is the current pixel, the iterator being arranged for starting at a top of the image and working downwards, and starting at a bottom of the image and working upwards.

6. The system according to claim 5, wherein the iterator is arranged for causing the optimization unit to process successive rows of the image, alternating from left to right and from right to left.

7. The system according to claim 5, further comprising a selector for randomly selecting the second pixels from the plurality of pixels spanning an image area having a width of more than half of an image width, wherein the image area is a substantially horizontal strip.

8. The method according to claim 1, wherein the color attribute depends on at least one of luminance and chromaticity.

9. The system according to claim 1, wherein the optimization unit is arranged for computing the depth related cost value also in dependence on a depth cue based on a predefined depth model.

10. The system according to claim 9, wherein the predefined depth model is a depth from motion model.

11. The system according to claim 1, further comprising a selective blurring unit for blurring at least one region of the image that is in a background according to a predefined depth model before determining the depth related cost value by the optimization unit.

12. An integrated circuit for computing a depth map comprising depth values representing distances to a viewer for one or more of a plurality of pixels of an image, the integrated circuit comprising:
    circuitry for defining a neighborhood of a current pixel of the plurality of pixels and for determining a depth related cost value of the current pixel, the depth related cost value being a minimal cost value among cost values of
  first pixels selected from the plurality of pixels in the neighborhood of the current pixel based on a difference between a color attribute of the first pixels and a corresponding color attribute of the current pixel, and
  second pixels selected from the plurality of pixels outside the neighborhood based on a difference between the color attribute of the second pixels and a corresponding color attribute of the current pixel, wherein the pixels in the neighborhood of the current pixel are within a predetermined distance from the current pixel and the pixels outside the neighborhood are further than the predetermined distance from the current pixel; and
an assigner for assigning a depth value to the current pixel in dependence on the determined depth related cost value.

13. A television comprising:
a 3D display for providing a video rendering having a three-dimensional appearance based on a depth map; and
a system for computing a depth map comprising depth values representing distances to a viewer for one or more of a plurality of pixels of an image, the system comprising:
an optimization unit for defining a neighborhood of a current pixel of the plurality of pixels and for determining a depth related cost value of the current pixel, the depth related cost value being a minimal cost value among cost values of
  first pixels selected from the plurality of pixels in a neighborhood of the current pixel based on a difference between a color attribute of the first pixels and a corresponding color attribute of the current pixel, and
  second pixels selected from the plurality of pixels outside the neighborhood based on a difference between the color attribute of the second pixels and a corresponding color attribute of the current pixel, wherein the pixels in the neighborhood of the current pixel are within a predetermined distance from the current pixel and the pixels outside the neighborhood are further than the predetermined distance from the current pixel; and
an assigner for assigning a depth value to the current pixel in dependence on the determined depth related cost value.

14. A camera comprising:
a capture means for capturing a video signal comprising a sequence of images;
a system for computing a depth map comprising depth values representing distances to a viewer for one or more of a plurality of pixels of one of the images, the system comprising:
an optimization unit for defining a neighborhood of a current pixel of the plurality of pixels and for determining a depth related cost value of the current pixel, the depth related cost value being a minimal cost value among cost values of
  first pixels selected from the plurality of pixels in a neighborhood of the current pixel based on a difference between a color attribute of the first and a corresponding color attribute of the current pixel, and
  second pixels selected from the plurality of pixels outside the neighborhood based on a difference between the color attribute of the second pixels and a corresponding color attribute of the current pixel, wherein the pixels in the neighborhood of the current pixel are within a predetermined distance from the current pixel and the pixels outside the neighborhood are further than the predetermined distance from the current pixel;
an assigner for assigning respective depth values to the respective current pixels in dependence on the respective determined depth related cost values to obtain the depth map;
a first output for providing the captured video signal; and
a second output for providing the depth map.

15. A method of computing a depth map comprising depth values representing distances to a viewer for one or more of a plurality of pixels of an image, the method comprising acts of:
defining a neighborhood of a current pixel of the plurality of pixels;
determining a depth related cost value of the current pixel, the depth related cost value being a minimal cost value among cost values of
  first pixels selected from the plurality of pixels in the neighborhood of the current pixel based on a difference between a color attribute of the first pixels and a corresponding color attribute of the current pixel, and
  second pixels selected from the plurality of pixels outside the neighborhood based on a difference between the color attribute of the second pixels and a corresponding color attribute of the current pixel, wherein the pixels in the neighborhood of the current pixel are within a predetermined distance from the current pixel and the pixels outside the neighborhood are further than the predetermined distance from the current pixel; and
assigning a depth value to the current pixel in dependence on the determined depth related cost value.

16. A non transitory medium comprising computer executable instructions of a computer program product for computing a depth map comprising depth values representing distances to a viewer for respective pixels of an image, the computer program product causing a processor to perform a method comprising acts of:
defining a neighborhood of a current pixel of the plurality of pixels wherein the pixels in the neighborhood of the current pixel are within a predetermined distance from the current pixel and the pixels outside the neighborhood are further than the predetermined distance from the current pixel;
determining a depth related cost value of the current pixel, the depth related cost value being a minimal cost value among cost values of
  first pixels selected from the plurality of pixels in a neighborhood of the current pixel based on a difference between a color attribute of the first pixels and a corresponding color attribute of the current pixel, and
  second pixels selected from the plurality of pixels outside the neighborhood based on a difference between the color attribute of the second pixels and a corresponding color attribute of the current pixel; and
assigning a depth value to the current pixel in dependence on the determined depth related cost value.

* * * * *